June 29, 1954   M. F. ECKER   2,682,281
BALL VALVE CAGE WITH RESILIENT BALL GUIDE
Filed Feb. 27, 1950
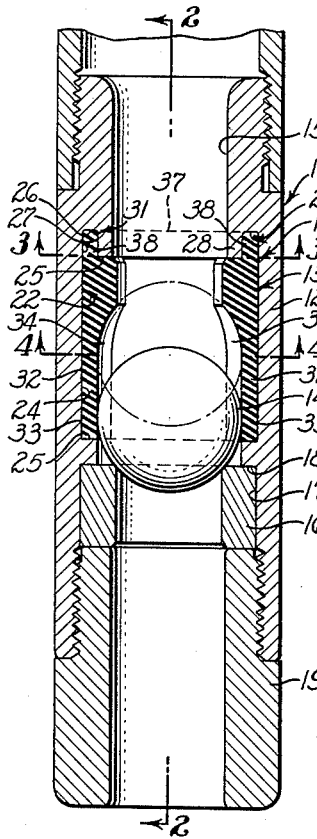
Fig. 1.
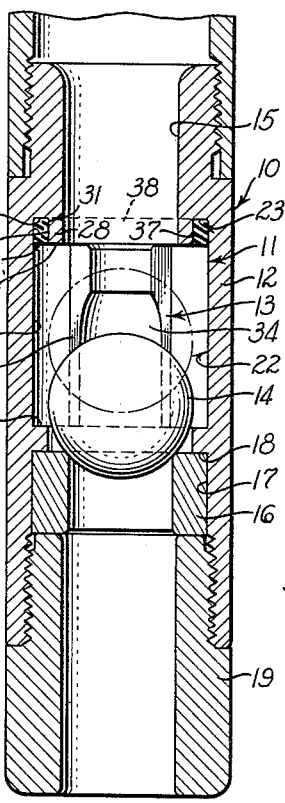
Fig. 2.
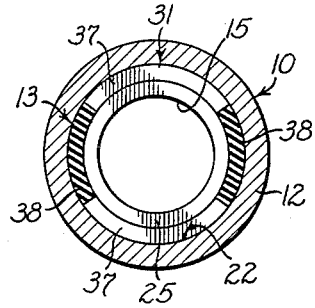
Fig. 3.
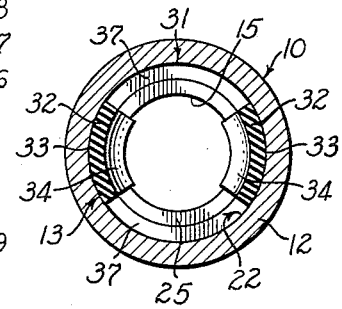
Fig. 4.
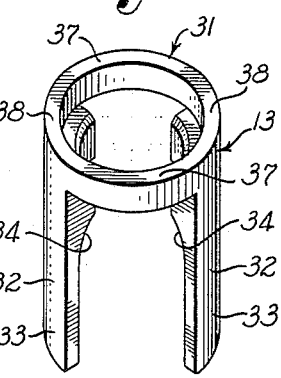
Fig. 5.
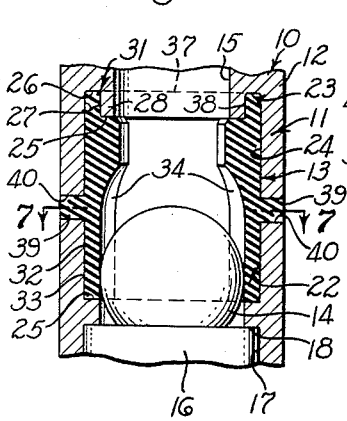
Fig. 6.
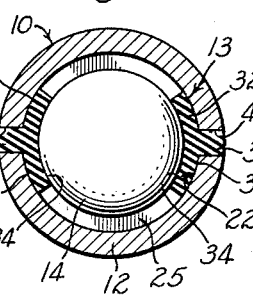
Fig. 7.
INVENTOR.
MURRY F. ECKER
BY HIS ATTORNEYS.
HARRIS, KIECH, FOSTER & HARRIS
BY

Patented June 29, 1954

2,682,281

UNITED STATES PATENT OFFICE 2,682,281

BALL VALVE CAGE WITH RESILIENT BALL GUIDE

Murry F. Ecker, Huntington Park, Calif., assignor to Pacific Pumps, Inc., Huntington Park, Calif., a corporation of California Application February 27, 1950, Serial No. 146,529

1 Claim. (Cl. 137—533.13)

My invention relates in general to ball check valves and, more particularly, to a cage for a ball valve, a primary object of the invention being to provide a cage having a flexible and resilient ball guide.

Ball valve cages having metallic ball guides are subject to considerable wear, particularly where a ball check valve incorporating a metallic ball guide opens and closes frequently, an example being the working valves incorporated in oil well pumps. As is well known in the art, a ball check valve employed as the working valve of an oil well pump opens and closes each time the pump piston goes through its pumping and return strokes. In addition to wear, the cage of such a conventional ball check valve is subject to a peening action each time the ball valve moves from its closed position to its open position. The ball valve itself is ordinarily not subject to any appreciable peening action, or to appreciable wear, since it is customarily made of a relatively hard metal to insure retention of its spherical configuration. Peening and wear of the cage in such a conventional ball check valve can be minimized by making the cage of a relatively hard metal also, but this is not a particularly desirable solution since it materially increases peening and wear of the ball valve and thus tends to destroy the desired spherical configuration of the ball valve. This, of course, may result in leakage past the ball valve when it is in its closed position since it does not engage its seat properly when no longer spherical.

The present invention, by providing a ball check valve having a cage with a ball guide of a flexible and resilient material, overcomes the foregoing disadvantages of metallic ball guides since the material of the ball guide, being flexible, yields when the ball valve comes in contact therewith, and, being resilient, subsequently resumes its original configuration. Thus, wear of the ball guide is minimized and peening thereof is substantially eliminated, all of which is an important feature of the invention.

In general, the invention provides a flexible and resilient ball guide which includes circumferentially spaced guide elements adapted to receive the ball valve therebetween, the circumferential spaces between the guide elements providing passages past the ball valve through which fluid may flow when the ball valve is in its open position. Two or more guide elements may be employed for the ball guide, the guide elements being diametrically opposed when two are employed.

An important object of my invention is to provide a unitary ball guide of the foregoing character wherein the circumferentially spaced guide elements are interconnected so that the ball guide may be assembled with, or disassembled from the body of the ball valve cage readily. Preferably, the guide elements of the ball guide are interconnected by arcuate connecting elements which co-operate with the guide elements at one end of the ball guide to form an annulus at said one end of the ball guide, which is another object of the invention.

Another important object of the invention is to provide a ball guide wherein at least the arcuate connecting elements defining said annulus are formed of a material which is considerably more flexible and softer than the guide elements to permit the ball guide to be distorted readily so as to facilitate assembly thereof with the body of the ball valve cage.

Preferably, the ball guide is formed of a flexible and resilient material of a rubber-like nature with at least the arcuate connecting elements forming the annulus of the ball guide being more flexible and softer than the guide elements themselves. The guide elements are preferably formed of a relatively hard, abrasion resistant material of the nature mentioned in order to minimize wear thereof.

Another object of the invention is to provide means for securing the ball guide in the cage body in a positive and reliable manner.

More particularly, an object of the invention is to provide a cage body having a passage therethrough, preferably in the form of a bore, and having an annular recess therein which encircles and communicates with the bore, the ball guide being disposed in such annular recess.

Another object is to provide a cage body having therein an annular groove which is adapted to receive the annulus at one end of the ball guide, such annular groove communicating with the annular recess mentioned, but being formed in a side wall of such recess so that it does not communicate with the bore, but is spaced outwardly therefrom and is separated therefrom by an annular portion of the cage body. With this construction, the ball guide is secured in the annular recess and groove in a positive manner, which is a feature of the invention.

Another object of the invention is to provide a ball check valve wherein the flexible and resilient ball guide may be inserted into its annular recess and groove through the bore, or its equivalent, in the cage body by virtue of the temporary deformation permitted by the increased flexibility of the arcuate elements interconnecting the guide elements.

In the accompanying drawing I have illustrated exemplary embodiments of the invention which attain the objects and possess the advantages hereinbefore outlined, together with other objects and advantages which will be apparent in the light of the following detailed description of such exemplary embodiments. Referring to the drawing:

Fig. 1 is a longitudinal sectional view of a ball check valve which embodies the invention;

Fig. 2 is another longitudinal sectional view thereof taken along the broken line 2—2 of Fig. 1;

Figs. 3 and 4 are transverse sectional views thereof taken along the broken lines 3—3 and 4—4 respectively, of Fig. 1;

Fig. 5 is an isometric view of a flexible and resilient ball guide of the invention;

Fig. 6 is a fragmentary, longitudinal sectional view which is similar to Fig. 1, but which illustrates another embodiment of the invention; and Fig. 7 is a transverse sectional view taken along the broken line 7—7 of Fig. 6.

Referring particularly to Figs. 1 and 2, the numeral 10 designates a ball check valve which embodies the invention and which may be employed in connection with any desired apparatus, such as the pump piston of a single-acting oil well pump, for example. The valve 10 includes a valve cage 11 comprising a cage body 12 and a flexible and resilient ball guide 13 for a ball valve 14. The cage body 12 is provided with a bore 15 therethrough which serves as a fluid passage, the ball valve 14 being adapted to seat on an annular seat element 16 to prevent downward flow through the bore 15, as viewed in the drawing. The annular seat element 16 is disposed in a counterbore 17 in the cage body and is seated against a shoulder 18 at the junction of the counterbore 17 with the bore 15, the annular seat element being retained in the counterbore 17 by a tubular nut 19 threaded into the counterbore.

The cage body 12 is provided with an annular recess 22 and an annular groove 23 therein in which the flexible and resilient ball guide 13 is disposed, the annular recess 22 communicating with the bore 15 and being defined by a base wall 24 substantially concentric with the bore and side walls 25 substantially normal to the bore. The annular groove 23 is directed axially of the cage body 12 and is formed in one of the side walls 25 of the annular recess 22, the annular groove 23 being defined by a base wall 26 substantially normal to the bore 15 and by side walls 27 substantially concentric with the bore 15. Thus, the annular groove 23 communicates with the annular recess 22, but not with the bore 15, the annular groove 23 being spaced outwardly from the bore 15 and being separated therefrom by an annular portion 28 of the cage body 12.

As best shown in Fig. 5, the flexible and resilient ball guide 13 is provided at one end with an annulus 31 which is insertable into the annular groove 23, the remainder of the ball guide being disposed in the annular recess 22. Thus, the ball guide is secured relative to the cage body 12 in a positive and reliable manner.

In the particular construction illustrated, the ball guide 13 includes two diametrically opposed, arcuate guide elements 32 which are adapted to receive the ball valve 14 therebetween, the guide elements 32 being spaced apart circumferentially of the ball guide 13 to provide fluid passages past the ball valve when it is in its open position, indicated in phantom in Figs. 1 and 2. The exterior surfaces 33 of the guide elements 32 conform in curvature to that of the base wall 24 of the annular recess 22, while the interior surfaces 34 thereof conform in curvature to that of the ball valve 14. The interior surfaces 34 of the guide elements 32 curve inwardly toward each other at their upper ends in converging relationship to limit upward movement of the ball valve 14 away from the annular seat element 16, thereby defining the open position of the ball valve.

The guide elements 32 are formed of a flexible and resilient material of a rubber-like nature, the guide elements being adapted to yield, by virtue of the flexibility of the material of which they are formed, upon impingement of the ball valve 14 thereon to minimize wear and to substantially eliminate any peening action by the ball valve. Preferably, the material of which the guide elements 32 are formed is relatively hard and abrasion resistant to further minimize wear. Examples of suitable materials for the guide elements 32 may be found hereinafter.

The annulus 31 at one end of the ball guide 13 interconnects the guide elements 32 to form a structure which may be assembled with or disassembled from the cage body 12 as a unit, which is an important feature of the invention. The annulus 31 includes arcuate connecting elements 37 which extend between and connect the guide elements 32, and includes arcuate end portions 38 of the guide elements 32. At least the arcuate connecting elements 37 of the annulus 31 are formed of a material which is materially more flexible and somewhat softer than that of the guide elements 32 so that the ball guide 13 may be deformed temporarily to permit its insertion as a unit through the bore 15 in the cage body 12 and into the recess 22 and groove 23 therein, which is an important feature of the invention. The arcuate connecting elements 37 alone may be formed of such relatively more flexible material and may be bonded to the guide elements 32, or the entire annulus 31 may be formed of such relatively more flexible material and bonded to the guide elements. With either construction, the arcuate connecting elements 37 may be deformed temporarily to permit insertion of the ball guide 13 through the bore 15 into the annular recess 22 and groove 23 as indicated.

A wide variety of rubber-like materials suitable for the arcuate connecting elements 37 and guide elements 32 is available. Examples are: compounds of butadiene acrylonitrile copolymers using plasticizers, fillers and vulcanizing agents common to the rubber industry; compounds of polyvinyl chloride vinyl chloride vinylidene chloride copolymers, vinyl chloride vinyl acetate copolymers, and these polymers themselves; combinations of vinyl chloride, vinylidene chloride vinyl chloride copolymers, vinylidene chloride vinyl acetate copolymers and butadiene acrylonitrile copolymers blended together by mechanical means; and the like. It will be understood that suitable materials for the arcuate connecting elements 37 and guide elements 32 may also be selected from other groups. Preferably, the materials for the arcuate connecting elements 37 and the guide elements 32 are so selected that the connecting elements are softer than the guide elements, in addition to being more readily deformable, which may be accomplished by blending various materials together. As an example, the connecting elements 37 and guide elements 32 may have Shore hardnesses of 90 and 75, respectively, although other values may also be used.

Referring to Figs. 6 and 7, in instances where rotation of the ball guide 13 relative to the cage body 12 would be detrimental, such rotation may be prevented by means of radially projecting lugs 39 formed integrally with the guide elements 32, such lugs being insertable into complementary openings 40 in the cage body 12. As will be apparent, the lugs 39 in effect key the ball guide 13 to the cage body 12 to prevent relative rotation.

As will be apparent, the greater flexibility and softness of the arcuate connecting elements 37, or the entire annulus 31, permits the ball guide to be deformed temporarily to an extent sufficient to permit insertion of the lugs 39 into the openings 40 during insertion of the ball guide into the annular recess 22 and groove 23 by way of the bore 15.

Although I have disclosed exemplary embodiments of my invention herein for purposes of illustration, it will be understood that various changes, modifications and substitutions may be incorporated in the embodiments disclosed without departing from the spirit of the invention.

I claim as my invention:

In a ball valve, the combination of: a tubular cage body having an axial bore therethrough and provided intermediate its ends with a cylindrical recess of greater diameter than said bore so as to form upper and lower annular shoulders at the respective ends of said recess, said upper shoulder being provided with an annular groove in the lower face thereof and communicating with said recess; a ball guide of resilient material including a plurality of vertical guide elements disposed in said recess and said groove, said guide elements being circumferentially spaced apart in said recess so as to provide vertical fluid passages therebetween, said guide elements having adjacent their upper ends surfaces engaging said upper shoulder and at their lower ends surfaces engaging said lower shoulder, said guide elements having adjacent their upper ends abutments extending radially into said bore, the undersides of said abutments having arcuate surfaces curving downwardly and outwardly, said guide elements including at their upper ends spaced arcuate end portions in said groove, said ball guide including arcuate connecting elements in said groove and extending between and interconnecting said arcuate end portions of said guide elements so that said arcuate end portions of said guide elements and said arcuate connecting elements form an unbroken annulus in said groove, said arcuate connecting elements being of a material which is materially more flexible than that of said guide elements so that said ball guide may be deformed temporarily for insertion as a unit into said recess and said groove; a valve seat in said cage body below said lower shoulder; and a ball valve within said ball guide between said abutments and said seat and adapted to be guided in its vertical movement between said seat and said abutments by said guide elements, said ball valve having a radius substantially the same as the radii of said arcuate surfaces and being engageable therewith.

References Cited in the file of this patent

UNITED STATES PATENTS

| Number | Name | Date |
|---|---|---|
| 669,328 | Stadeli | Mar. 5, 1901 |
| 1,725,235 | Wellensiek | Aug. 20, 1929 |
| 1,861,674 | Winterhoff | June 7, 1932 |
| 1,901,217 | Yerkes | Mar. 14, 1933 |
| 1,989,199 | Hummert | Jan. 29, 1935 |
| 2,144,427 | Longstreet | Jan. 17, 1939 |
| 2,309,839 | Gardner | Feb. 2, 1943 |
| 2,591,174 | Martin | Apr. 1, 1952 |

FOREIGN PATENTS

| Number | Country | Date |
|---|---|---|
| 496,675 | Germany | 1930 |